(12) United States Patent
Tseng (10) Patent No.: US 6,276,125 B1
(45) Date of Patent: Aug. 21, 2001

(54) PRESSURE BALANCED POPPET VALVE

(75) Inventor: Raymond R. Tseng, Chandler, AZ (US)

(73) Assignee: AlliedSignal, Inc., Morris Township, NJ (US)

( * ) Notice: Subject to any disclaimer, the term of this patent is extended or adjusted under 35 U.S.C. 154(b) by 0 days.

(21) Appl. No.: 09/215,447

(22) Filed: Dec. 17, 1998

(51) Int. Cl.[7] ............... F02K 9/80; F16K 31/143; F16K 31/363; F16K 39/00
(52) U.S. Cl. ............... 60/229; 60/271; 251/63; 251/282
(58) Field of Search ............... 60/228, 229, 271; 244/169; 251/63, 282

(56) References Cited

U.S. PATENT DOCUMENTS

| | | | |
|---|---|---|---|
| H1098 | * 9/1992 | Hallum | 60/229 |
| 3,121,440 | * 2/1964 | Heller | 244/169 |
| 3,319,423 | * 5/1967 | Caraher | 60/242 |
| 3,608,581 | 9/1971 | Sweet . | |
| 3,677,286 | 7/1972 | Wolfson . | |
| 3,721,402 | * 3/1973 | Holland | 60/229 |
| 3,987,814 | 10/1976 | Hall . | |
| 4,312,374 | 1/1982 | Drori . | |
| 4,346,841 | 8/1982 | Fenne . | |
| 4,477,056 | * 10/1984 | Alexius | 251/282 |
| 4,760,694 | * 8/1988 | Gillon, Jr. | 60/200.1 |
| 4,826,104 | * 5/1989 | Bennett et al. | 244/3.22 |
| 5,203,372 | 4/1993 | Freiler . | |
| 5,456,425 | * 10/1995 | Morris et al. | 244/3.22 |

\* cited by examiner

*Primary Examiner*—Ted Kim
(74) *Attorney, Agent, or Firm*—Keith Newberry, Esq.

(57) ABSTRACT

A valve is disclosed for regulating the flow of a pressurized working fluid through a nozzle having a nozzle throat. In a preferred embodiment of the invention, the valve comprises a valve body defining a valve bore, a pressure inlet and a nozzle plenum. The nozzle plenum fluidly communicates with the nozzle throat. A valve seat is disposed between the pressure inlet and the nozzle plenum. A valve member is slidably disposed within the valve bore. The valve member comprises a first end disposed proximal the valve seat and a second end distal the valve seat. The first end comprises a valve face and the second end comprises first and second rear surfaces. The second rear surface is spaced apart from the first rear surface. The first rear surface cooperates with the valve bore to define a rear chamber. The second rear surface cooperates with the valve bore to define an actuation chamber, the volume of which is not a function of the valve member diameter. The valve member is responsive to pressure in the second chamber to move between a first position and a second position. In the first position, the valve face is spaced apart from the valve seat thereby permitting fluid communication between the pressure inlet and the nozzle plenum. In the second position, the valve face is seated against the valve seat thereby precluding fluid communication between the pressure inlet and the nozzle. A conduit provides fluid communication between the nozzle plenum and the first chamber.

16 Claims, 5 Drawing Sheets

PRESSURE BALANCED POPPET VALVE

FIELD OF THE INVENTION

The present invention relates generally to valving devices. More particularly, the invention relates to a valve for regulating gas flow from a rocket motor or gas generator to a reaction jet nozzle.

BACKGROUND OF THE INVENTION

It is well known in the art to employ reaction jets that vary the pitch, yaw, spin rate and other dynamic characteristics of a missile or space vehicle in flight. A typical reaction jet comprises a jet nozzle and a housing defining a main stage plenum. An annular passage supplies pressurized fluid to the main stage plenum to be discharged through the jet nozzle, thereby creating reaction jet thrust. Disposed within the reaction jet housing is a valve member, often comprising a poppet valve. The poppet valve regulates the flow of pressurized fluid from the annular passage through the jet nozzle by moving alternately between a fully opened position and a closed position.

In the fully open position, the poppet valve is retracted from a position abutting a valve seat formed between the annular passage and the nozzle. In the closed position, the poppet valve is position in abutment with the valve seat thereby sealing the annular passage from the plenum. The poppet valve is urged between the open and closed positions by the pressure balance between the fluid pressure in the plenum and the fluid pressure in a main stage actuation chamber. When the pressure in the main stage actuation chamber is greater than the pressure in the plenum, the poppet valve is urged towards the closed position. Conversely, when the pressure in the main stage actuation chamber drops such that the pressure in the plenum is greater than the pressure in the main stage actuation chamber, the poppet valve is urged toward the fully open position. The actuation chamber normally is axially aligned with the poppet valve and disposed on the opposite side of the poppet valve from the plenum. Accordingly, the actuation chamber is of approximately the same diameter as the poppet valve such that the working volume of the actuation chamber volume is approximately equal to the swept volume of the poppet valve.

Typically, the main stage actuation chamber is pressurized and vented by a pilot valve. Control of pilot valve pressurization and venting conventionally is achieved by a solenoid-actuated flapper valve, which opens and closes to admit or vent high pressure gas to and from the main stage actuation chamber.

Because missiles and space vehicles typically move at high rates of speed, it is critical to the control of such craft that the reaction jets have a high rate of response between their respective on and off positions. Accordingly, it is desirable to minimize the time and work necessary to move the poppet valve between the open and closed positions. At the same time, in order to preserve desired mass flow rate through the nozzle, the plenum and poppet valve diameters must be maintained. These objectives may be achieved by minimizing the actuation chamber volume and/or minimizing aerodynamic resistance of the poppet valve member movement within the valve body.

Accordingly, a need exists for a reaction jet valve that provides maximum flow rate through the nozzle with minimal time and work needed to control the flow through the nozzle.

SUMMARY OF THE INVENTION

In accordance with the present invention, a valve is disclosed for regulating the flow of a pressurized working fluid through a nozzle having a nozzle throat.

In a preferred embodiment of the invention, the valve comprises a valve body defining a valve bore, a pressure inlet and a nozzle plenum. The nozzle plenum fluidly communicates with the nozzle throat. A poppet valve seat is disposed between the pressure inlet and the nozzle plenum. A poppet valve member is slidably disposed within the valve bore. The valve member comprises a first end disposed proximal the valve seat and a second end distal the valve seat. The first end comprises a valve face and the second end comprises first and second rear surfaces. The second rear surface is spaced apart from the first rear surface. The first rear surface cooperates with the valve bore to define a rear chamber. The second rear surface cooperates with the valve bore to define an actuation chamber, the volume of which is independent of the valve member diameter. The valve member is responsive to pressure in the second chamber to move between a first position and a second position. In the first position, the valve face is spaced apart from the valve seat thereby permitting fluid communication between the pressure inlet and the nozzle plenum. In the second position, the valve face is seated against the valve seat thereby precluding fluid communication between the pressure inlet and the nozzle. A conduit provides fluid communication between the nozzle plenum and the first chamber, thereby providing a pressure balance between the front and rear surfaces of the valve member. This pressure balance, in turn, reduces the total force that must be applied by the actuator chamber in order to cause the valve member to move.

BRIEF DESCRIPTION OF THE DRAWING

The invention will be better understood from a reading of the following detailed description taken in conjunction with the drawing figures in which like reference designators are used to designate like elements, and in which.

DETAILED DESCRIPTION

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

Figure 1:
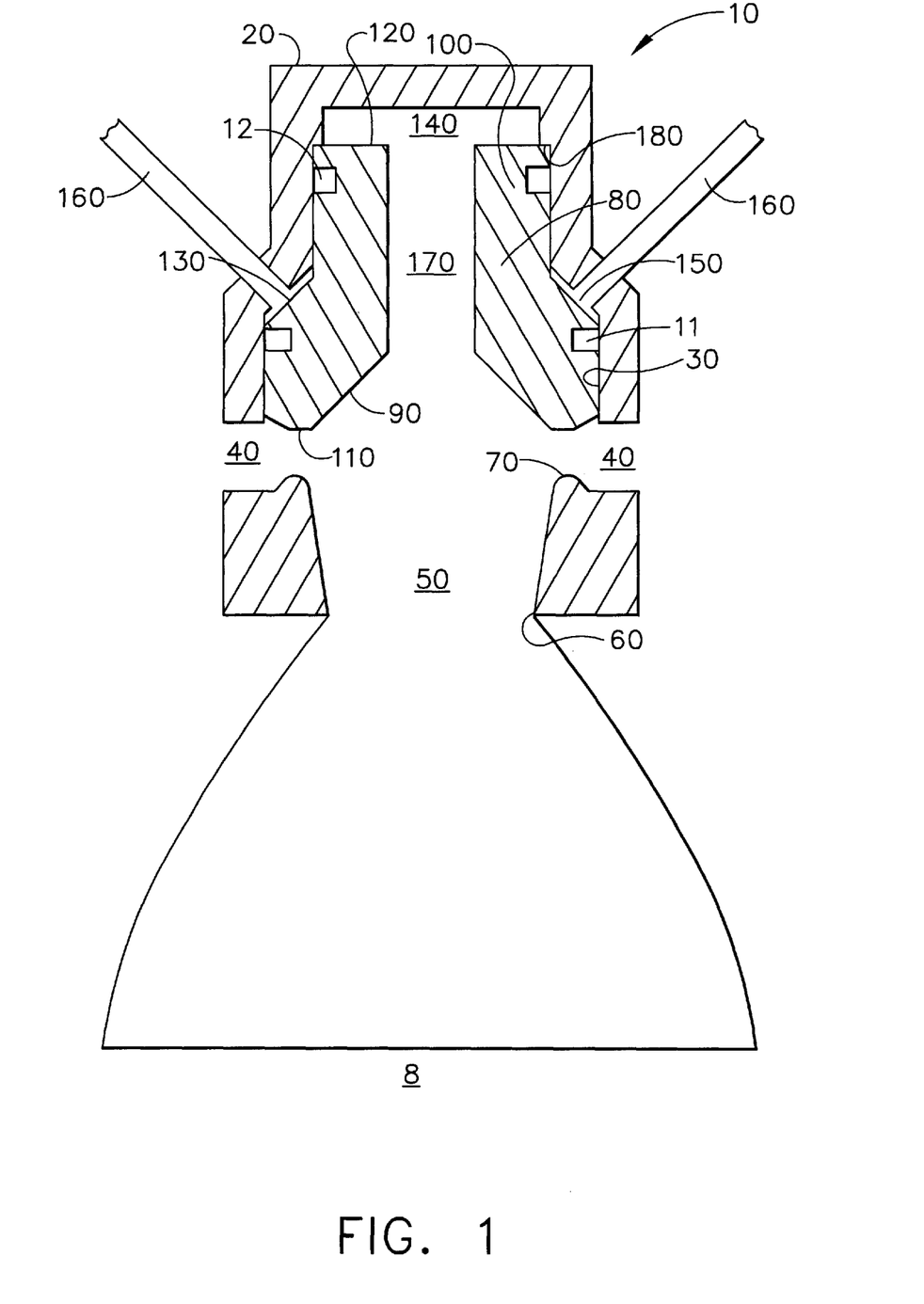
FIG. 1 depicts a fragmentary cross-sectional view of a valve incorporating features of the present invention in an open position.

FIG. 1 shows in cross-section a reaction jet 8 comprising a valve 10 incorporating principles of the present invention. Valve 10 comprises a valve body 20 defining a valve bore 30, a pressure inlet 40 and a nozzle plenum 50. Nozzle plenum 50 fluidly communicates with a nozzle throat 60. A valve seat 70 is disposed between pressure inlet 40 and nozzle plenum 50. A valve member 80 is slidably disposed within valve bore 30. Valve member 80 may comprise a poppet or other shuttle-type valve member known in the art. Valve member 80 comprises a bore 170 therethrough, a first end 90 disposed proximal valve seat 70 and a second end 100 distal valve seat 70. First end 90 comprises a valve face 110 and second end 100 comprises a first rear surface 120 and a second rear surface 130. Second rear surface 130 is spaced apart from first rear surface 120. First rear surface 120 cooperates with valve bore 30 to define a rear chamber 140. Second rear surface 130 cooperates with valve bore 30 to define an annular actuation chamber 150 disposed radially outward of and axially spaced apart from rear chamber 140 and first rear surface 120 (shown more clearly in FIG. 2). A first circumferential piston seal 11 prevents leakage between actuation chamber 150 and pressure inlet 40. A second circumferential piston seal 12 prevents leakage between actuation chamber 150 and rear chamber 140.

Valve member 80 is responsive to pressure in actuation chamber 150 to move between an open position and a closed position. Pressurized fluid present in actuation chamber 150 is supplied by and vented out through a pilot valve (not shown) via actuation conduits 160. In moving valve member 80 from the closed to the open position, as shown in FIG. 1, actuation chamber 150 is depressurized by permitting it to vent through conduit 160. Because the projected area of first end 90 is greater than that of first rear surface 120, although the pressure in chamber 140 is equal to the pressure in plenum 50, the net force causes valve member to move upward causing valve face 110 to move away from valve seat 70 until first rear surface 120 abuts stop 180. With valve face 110 so situated, fluid communication between pressure inlet 40 and nozzle plenum 50 is substantially restricted.

Figure 2:
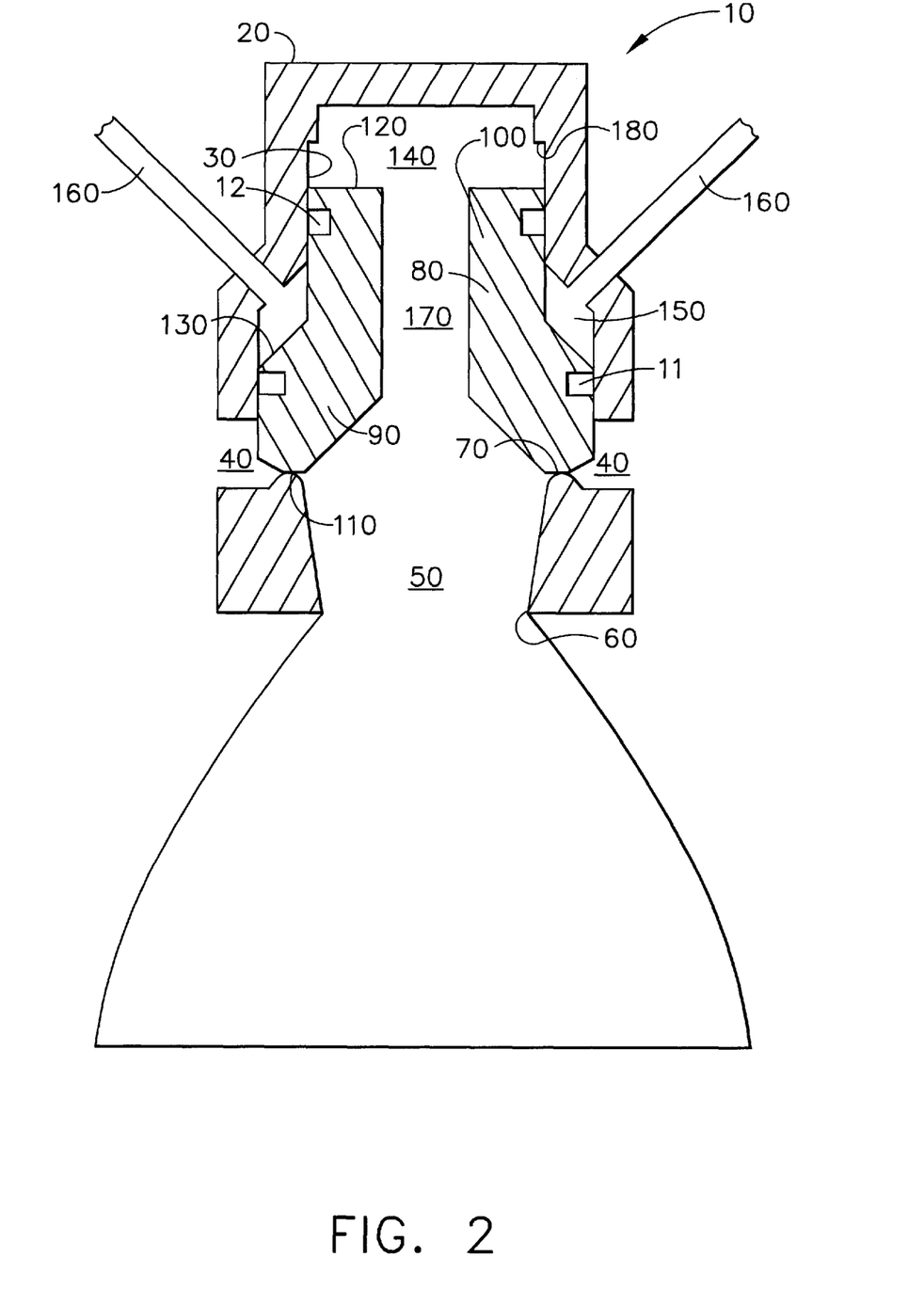
FIG. 2 depicts a cross-sectional view of the valve of FIG. 1 in a closed position.

In moving valve member 80 from the open to the closed position, as shown in FIG. 2, pressurized fluid is received by actuation chamber 150 from conduits 160 pressure in chamber 150 forces valve member toward valve seat 70 until valve face 110 comes into substantially static sealing abutment against valve seat 70. With valve face 110 so situated, fluid communication between pressure inlet 40 and nozzle plenum 50 is precluded.

Conduit 170 provides substantially unrestricted fluid communication between nozzle plenum 50 and rear chamber 140 thereby ensuring that fluid pressure in nozzle plenum 50 and rear chamber 140 remains substantially equal at all times. By maintaining a pressure balance between rear chamber 140 and plenum 50, valve member 80 encounters minimal fluid resistance when moving from the closed to open position. Moreover, although valve member 80 is substantial in size, as dictated by the flow requirements of reaction jet 8, the swept volume of actuation chamber 150 is relatively small. By minimizing the volume of fluid necessary to pressurize actuation chamber 150, it is possible to reduce the size and, consequently, the response time of the pilot valve that is used to control valve 10.

Figure 3:
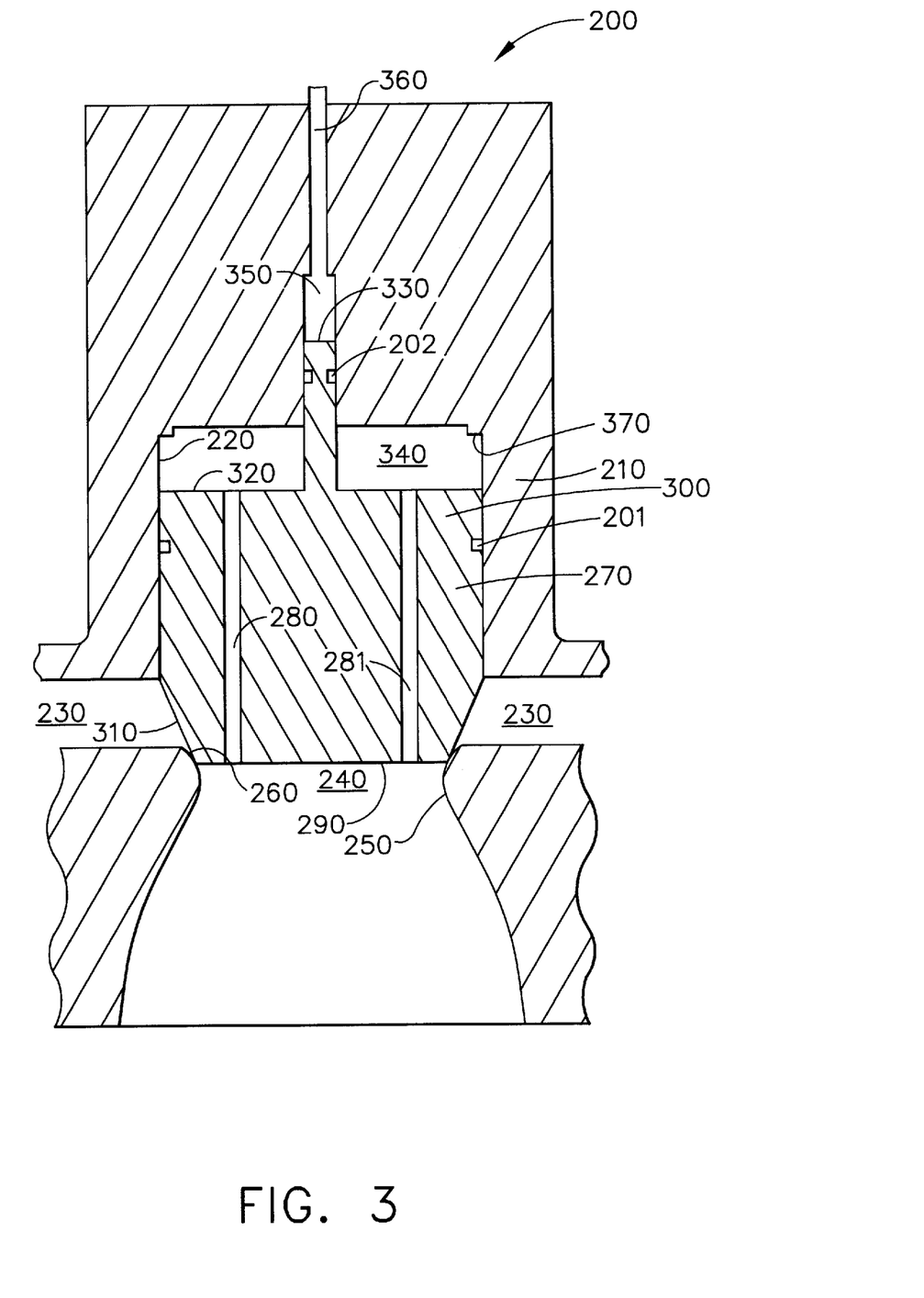
FIG. 3 depicts a cross-sectional view of an alternative embodiment of a valve incorporating features of the present invention.

FIG. 3 depicts in cross-section an alternative embodiment of a valve incorporating features of the present invention depicted in a closed position. Valve 200 comprises a valve body 210 defining a valve bore 220, a pressure inlet 230 and a nozzle plenum 240. Nozzle plenum 240 fluidly communicates with a nozzle throat 250. A valve seat 260 is disposed between pressure inlet 230 and nozzle plenum 240. A valve member 270 is slidably disposed within valve bore 220. Valve member 270 comprises a pair of bores 280, 281, a first end 290 disposed proximal valve seat 260 and a second end 300 distal valve seat 260. First end 290 comprises a valve face 310 and second end 300 comprises a first rear surface 320 and a second rear surface 330. Second rear surface 330 is spaced apart from first rear surface 320. First rear surface 320 cooperates with valve bore 220 to define an annular first rear chamber 340. Second rear surface 330 cooperates with valve bore 220 to define a cylindrical actuation chamber 350 disposed radially inward of and axially offset from first rear chamber 340. Because actuation chamber 350 is independent of first rear surface 320, the volume of actuation chamber 350 is not a function of the diameter of first rear surface 320 and therefore the swept volume of actuation chamber 350 is not dictated by the swept volume of valve member 270. A first circumferential piston seal 201 prevents leakage between first rear chamber 340 and pressure inlet 230. A second circumferential piston seal 202 prevents leakage between first rear chamber 340 and actuation chamber 350.

Valve member 270 is responsive to pressure in actuation chamber 350 to move between an open position and a closed position. Pressurized fluid present in actuation chamber 350 is supplied by and vented out through a pilot valve (not shown) via actuation inlet 360. In moving valve member 270 from the closed to the open position, pressurized fluid present in actuation chamber 350 is vented out through inlet 360. Venting of actuation chamber 350 allows pressurized fluid supplied by pressure inlet 230 to force valve face 310 away from valve seat 260 until first rear surface 320 is forced into substantially static abutment against stop 370. With valve face 310 so situated, fluid communication between pressure inlet 230 and nozzle plenum 240 is permitted.

In moving valve member 270 from the open to the closed position, pressurized fluid is received by actuation chamber 350 from inlet 360, which forces valve face 310 into substantially static sealing abutment against valve seat 260. With valve face 310 so situated, fluid communication between pressure inlet 230 and nozzle plenum 240 is precluded.

Bores 280 and 281 provide fluid communication between nozzle plenum 240 and first rear chamber 340. Fluid communication between nozzle plenum 240 and first rear chamber 340, ensures that fluid pressure in nozzle plenum 240 and first rear chamber 340 remains substantially equal at all times. Accordingly, valve member 270 encounters minimal fluid resistance when moving from the closed to open position.

Figure 4:
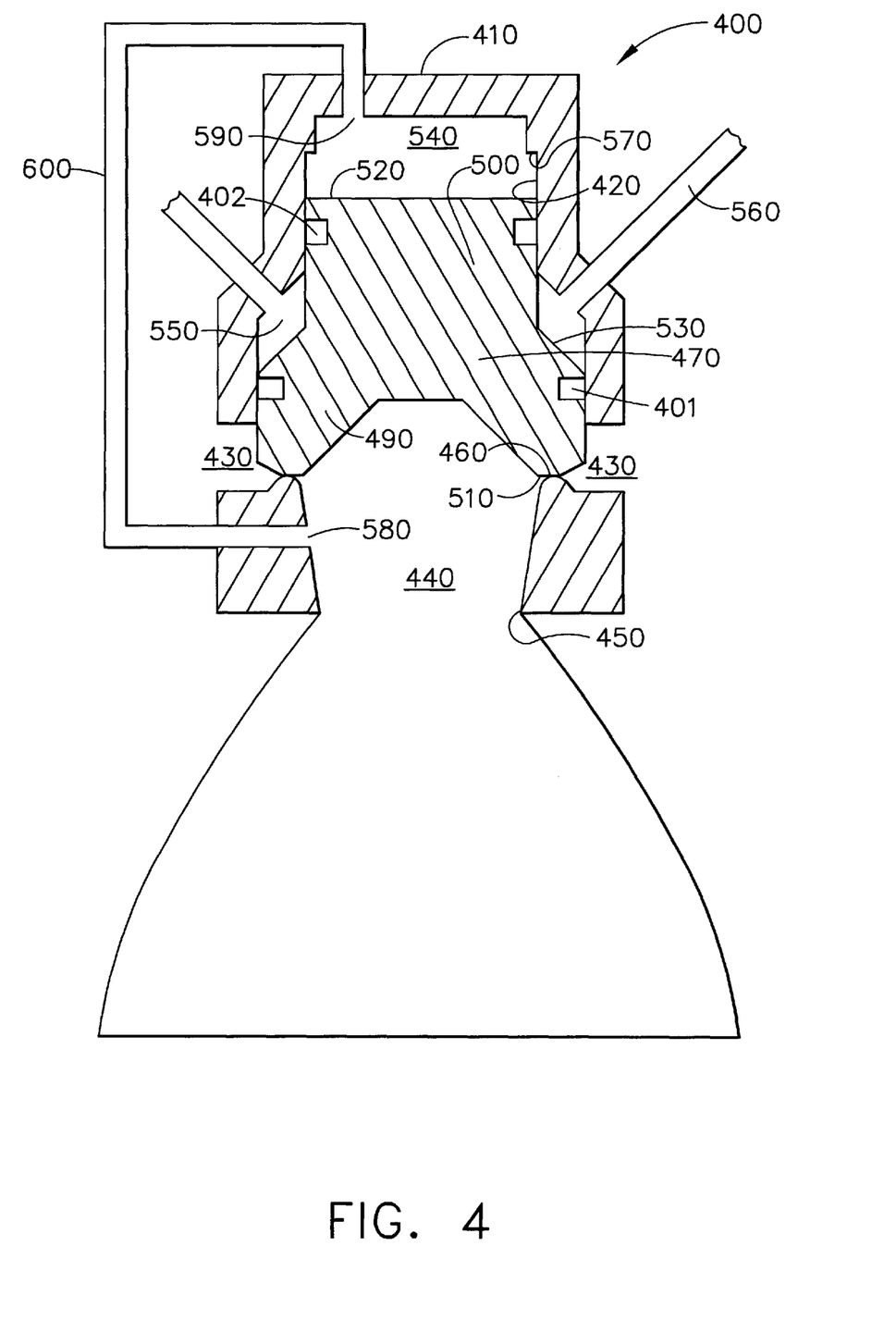
FIG. 4 depicts a cross-sectional view of an alternative embodiment of a valve incorporating features of the present invention in which an external conduit provides fluid communication between the nozzle plenum and the rear chamber.

FIG. 4 depicts in cross-section yet another alternative embodiment of a valve incorporating features of the present invention depicted in a closed position. Valve 400 comprises a valve body 410 defining a valve bore 420, a pressure inlet 430 and a nozzle plenum 440. Nozzle plenum 440 fluidly communicates with a nozzle throat 450. A valve seat 460 is disposed between pressure inlet 430 and nozzle plenum 440. A valve member 470 is slidably disposed within valve bore 420. Valve member 470 comprises a first end 490 disposed proximal valve seat 460 and a second end 500 distal valve seat 460. First end 490 comprises a valve face 510 and second end 500 comprises a first rear surface 520 and a second rear surface 530. Second rear surface 530 is disposed radially outward from and axially spaced apart from first rear surface 520. First rear surface 520 cooperates with valve bore 420 to define a rear chamber 540. Second rear surface 530 cooperates with valve bore 420 to define an annular actuation chamber 550 disposed radially outward of rear chamber 540 and first rear surface 520. A first circumferential piston seal 401 prevents leakage between actuation chamber 550 and pressure inlet 430. A second circumferential piston seal 402 prevents leakage between actuation chamber 550 and rear chamber 540.

Valve member 470 is responsive to pressure in actuation chamber 550 to move between an open position and a closed position. Pressurized fluid present in actuation chamber 550 is supplied by and vented out through the pilot valve (not shown) via actuation conduits 560. In moving valve member 470 from the closed to the open position, pressurized fluid present in actuation chamber 550 is vented out through actuation conduits 560. Venting of actuation chamber 550 allows pressurized fluid supplied by pressure inlet 430 to force valve face 510 away from valve seat 460, until first rear surface 520 abuts against stop 570. With valve face 510 so situated, fluid communication between pressure inlet 430 and nozzle plenum 440 is permitted.

In moving valve member 470 from the open to the closed position, pressurized fluid is received by actuation chamber 550 from conduit 560 which forces valve face 510 into substantially static sealing abutment against valve seat 460. With valve face 510 so situated, fluid communication between pressure inlet 430 and nozzle plenum 440 is precluded.

Valve body 410 further comprises a first port 580 in fluid communication with nozzle plenum 440 and a second port 590 in fluid communication with rear chamber 540. A fluid conduit 600 interconnects first port 580 with second port 590. Conduit 600 provides fluid communication between nozzle plenum 440 and rear chamber 540 and ensures that fluid pressure in nozzle plenum 440 and rear chamber 540 remains substantially equal at all times. Accordingly, valve member 470 encounters minimal fluid resistance when moving from the closed to open position.

Figure 5:
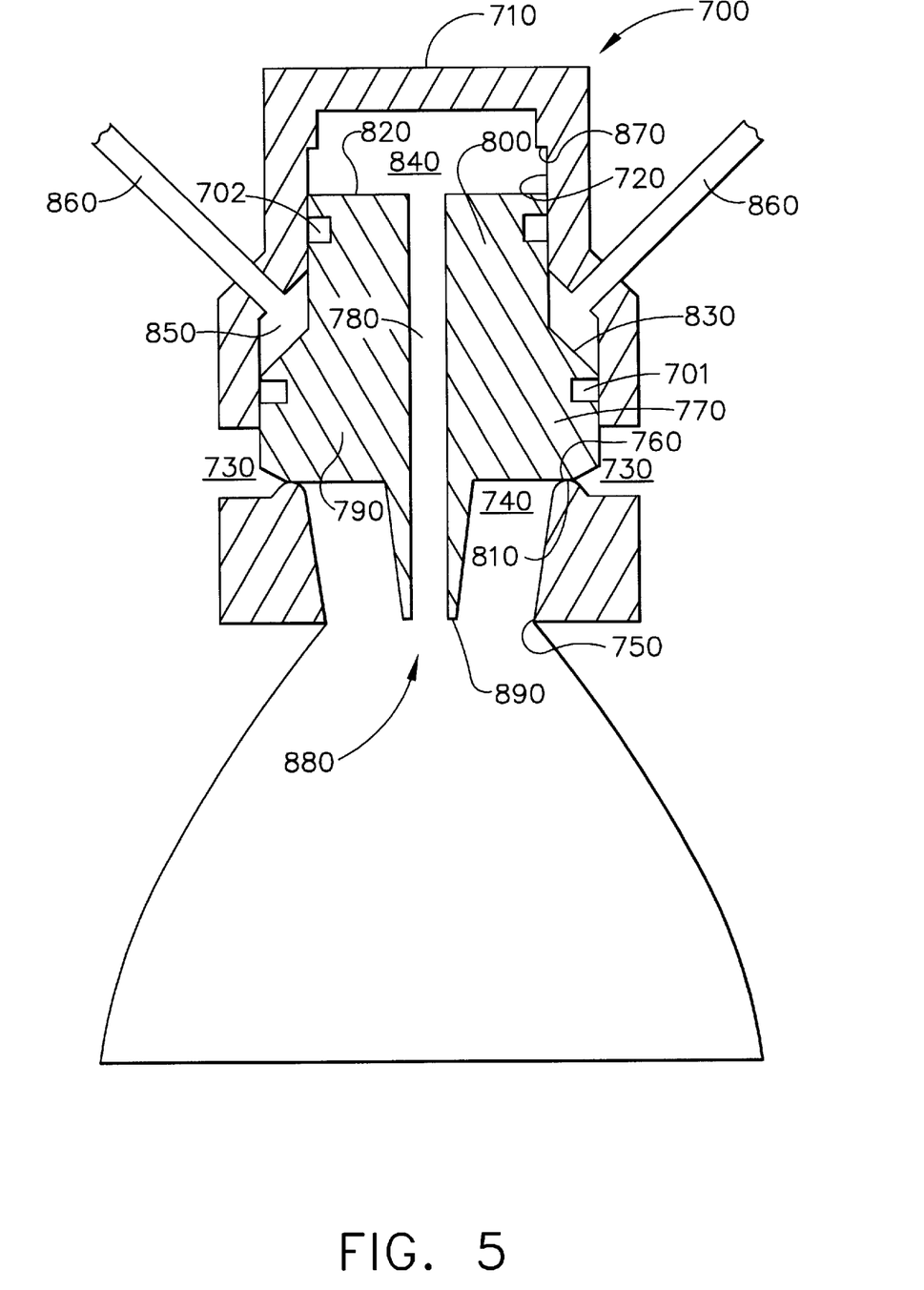
FIG. 5 depicts a cross-sectional view of an alternative embodiment of a valve incorporating features of the present in which the conduit includes a conduit extension.

FIG. 5 depicts in cross-section yet another alternative embodiment of a valve incorporating features of the present invention depicted in a closed position. Valve 700 comprises a valve body 710 defining a valve bore 720, a pressure inlet 730 and a nozzle plenum 740. Nozzle plenum 740 fluidly communicates with a nozzle throat 750. A valve seat 760 is disposed between pressure inlet 730 and nozzle plenum 740. A valve member 770 is slidably disposed within valve bore 720. Valve member 770 comprises a bore 780, a first end 790 disposed proximal valve seat 760 and a second end 800 distal valve seat 760. First end 790 comprises a valve face 810 and second end 800 comprises a first surface 820 and a second rear surface 830. Second rear surface 830 is spaced apart from first rear surface 820. First rear surface 820 cooperates with valve bore 720 to define a rear chamber 840. Second rear surface 830 cooperates with valve bore 720 to define an annular actuation chamber 850 disposed radially outward of and axially displaced from rear chamber 840 and first rear surface 820. A first circumferential piston seal 701 prevents leakage between actuation chamber 850 and pressure inlet 730. A second circumferential piston seal 702 prevents leakage between actuation chamber 850 and rear chamber 840.

Valve member 770 is responsive to pressure in actuation chamber 850 to move between an open position and a closed position. Pressurized fluid present in actuation chamber 850 is supplied by and vented out through a pilot valve (not shown) via actuation conduits 860. In moving valve member 770 from the closed to the open position, pressurized fluid present in actuation chamber 850 is vented out through conduits 860. Venting of actuation chamber 850 allows pressurized fluid supplied by pressure inlet 730 to force valve face 810 away from valve seat 760, until first rear surface 820 abuts stop 870. With valve face 810 so situated, fluid communication between pressure inlet 730 and nozzle plenum 740 is permitted.

In moving valve member 770 from the open to the closed position, pressurized fluid is received by actuation chamber 850 from conduit 860 which forces valve face 810 into substantially static sealing abutment against valve seat 760. With valve face 810 so situated, fluid communication between pressure inlet 730 and nozzle plenum 740 is precluded.

Valve member 770 includes a conduit extension 880 comprising a pressure tap 890 extending from first end 790 toward nozzle throat 750. Bore 780 extends from second end 800 through pressure tap 890 thereby providing fluid communication between nozzle throat 750 and rear chamber 840. When valve member 770 is in the open position, fluid pressure in rear chamber 840 is substantially equal to the relatively high fluid pressure in nozzle plenum 740. As valve face 810 is urged toward valve seat 760, pressure tap 890 moves from a position within nozzle plenum 740 into nozzle throat 750. Because the static pressure in nozzle throat 750 is inherently lower than the static pressure in plenum 740, as pressure tap 890 moves further into throat 750, progressively lower pressure fluid is communicated to rear chamber 840. The progressively lower pressure fluid in rear chamber 840 causes of valve member 770 to decelerate as valve face 810 approaches valve seat 760, thereby lessening the impact of valve face 810 upon valve seat 760, without significant loss of response time of valve member 770.

Various modifications and alterations of the above described sealing apparatus will be apparent to those skilled in the art. For example, valve member 270, as depicted in FIG. 3 may comprise a single conduit 280. Accordingly, the foregoing detailed description of the preferred embodiment of the invention should be considered exemplary in nature and not as limiting to the scope of the invention as set forth in the following claims.

What is claimed is:

1. A valve for regulating the flow of a pressurized working fluid through a nozzle having a throat, the valve comprising:

a valve body defining a first chamber and having a volume and a first plenum, said first plenum fluidly communicating with the throat;

a first conduit permitting fluid communication between said first chamber and said first plenum;

a first pressure inlet supplying the pressurized working fluid to said first plenum;

a valve member disposed within the valve body between said first chamber and said first plenum, said valve member movable between a first position and a second position, said first position comprising the valve member being spaced apart from said first pressure inlet thereby allowing fluid communication between said first pressure inlet and said first plenum, and said second position comprising the valve member blocking fluid flow from the first pressure inlet; and a second pressure inlet operatively coupled to said valve member, wherein at least a substantial portion of flow through said second inlet into the valve is isolated from the flow in the valve through said conduit, wherein said valve member being responsive to rising pressure in said second pressure inlet to move from said first position to said second position, and responsive to falling pressure to move from said second position to said first position, wherein movement of the valve member changes the volume of the first chamber wherein when in the second position the volume of the first chamber is greater than the volume of the first chamber when the valve member is in the first position.

2. A valve in accordance with claim 1 further comprising:
a valve seat operatively disposed between said first pressure inlet and the throat, wherein said second position comprises the valve member abutting said valve seat thereby preventing fluid communication between said first pressure inlet and said throat.

3. A valve in accordance with claim 1, wherein:
said first conduit comprises a passage disposed through said valve member.

4. A valve in accordance with claim 1, wherein:
said valve member comprises a poppet slidably disposed within said valve body.

5. A valve in accordance with claim 4, wherein:
said valve member further comprises first and second ends, said first end comprising a first surface including a valve face, said second end comprising a second surface in fluid communication with said first chamber, said second end further comprising a third surface, said third surface cooperating with said valve body to define a second chamber, said second chamber being in fluid communication with a second pressure inlet, said second pressure inlet being adapted to supply a source of fluid pressure to said second chamber for urging said valve member into said second position.

6. A reaction jet for a maneuvering aerospace vehicle comprising;
a pyrotechnic gas generator for providing a source of pressurized gas;
a nozzle for directing said pressurized gas, said nozzle comprising a throat; and
a valve for regulating the flow of pressurized gas through the throat, the valve comprising,
a valve body defining a first chamber having a volume, the valve body further having a first plenum, said first plenum fluidly communicating with the throat,
a conduit providing fluid communication between said first plenum and said first chamber;
a first pressure inlet supplying the pressurized gas to said first plenum,
a valve seat operatively disposed between said first pressure inlet and the throat,
a valve member disposed within the valve body between said first chamber and said first plenum, said valve member being moveable between a first position and a second position, said first position comprising the valve member being spaced apart from said valve seat thereby allowing fluid communication between said first pressure inlet and said first plenum, said second position comprising the valve member abutting said valve seat thereby preventing fluid communication between said first pressure inlet and said first plenum, and
a second chamber in fluid communication with a surface of said valve member, said valve member being responsive to rising pressure in said second chamber to move from said first position to said second position, wherein movement of the valve member changes the volume of the first chamber wherein when in the second position the volume of the first chamber is greater than the volume of the first chamber when the valve member is in the first position, and wherein within the valve at least a substantial portion of flow into said second chamber is isolated from the flow in the valve through said conduit.

7. A valve for regulating the flow of a pressurized working fluid through a nozzle having a nozzle throat comprising:
a valve body defining a valve bore;
said valve body further defining a fluid flow order, a pressure inlet and a nozzle plenum, the nozzle plenum being in fluid communication with a nozzle throat;
a conduit providing fluid communication between the nozzle plenum and a first chamber;
a valve seat disposed in fluid flow order between the pressure inlet and the nozzle plenum; and
a valve member slidably disposed within the valve bore, said valve member comprising a first end disposed proximal the valve seat and a second end distal the valve seat, the first end comprising a valve face and the second end comprising first and second rear surfaces, the second rear surface being spaced apart from the first rear surface, the first rear surface cooperating with the valve bore to define the first chamber, the second rear surface cooperating with the valve bore to define a second chamber; said valve member being responsive to an increase in pressure in the second chamber to move from a first position to a second position, the first position comprising the valve face being spaced apart from the valve set thereby permitting fluid communication between the pressure inlet and the nozzle plenum, the second position comprising the valve face being seated against the valve seat thereby precluding fluid communication between the pressure inlet and the nozzle, wherein movement of the valve member changes the volume of the first chamber wherein when in the second position the volume of the first chamber is greater than the volume of the first chamber when the valve member is in the first position, and wherein within the valve at least a substantial portion of flow into said second chamber is isolated from the flow in the valve through said conduit.

8. A valve in accordance with claim 7, wherein:
said conduit comprises a bore through said valve member from the first end to the second end.

9. A valve in accordance with claim 7, wherein:
said valve body further comprises a first port in fluid communication with the nozzle plenum and a second port in fluid communication with the first chamber and said conduit comprising a fluid passage external of said valve member interconnecting the first port with the second port.

10. A valve in accordance with claim 7, wherein:
said second chamber comprises an annulus disposed radially outward of said first chamber.

11. A valve in accordance with claim 7, wherein:
said second chamber is disposed radially inward of said first chamber.

12. A valve in accordance with claim 7, wherein:
said valve member further comprises a conduit extension, said conduit extension comprising an elongate member extending from the first end toward the nozzle throat, said conduit extension further comprising an axial bore through said valve member providing communication between the nozzle throat and the first chamber.

13. A valve for regulating the flow of a pressurized working fluid through a nozzle having a throat, the valve comprising:
a valve body having a cavity leading to an opening in communication with the nozzle;
a valve member having a first and a second end and fitted within the cavity wherein the member can move between a first and a second position;

a first chamber definable between the first end of the valve member and the valve body, the first chamber for receiving fluid, the first chamber having a volume that increases as the body moves from the first to the second position and that decreases as the body moves from the second to the first position;

a plenum defined within the valve body proximate the member second end, wherein the plenum is in fluid communication with the nozzle throat and in fluid communication with the first chamber;

a first pressure inlet for supplying a working fluid to the plenum, wherein when the member is in the first position it permits flow through the inlet and when in the second position it blocks flow through the inlet; and a second chamber definable between the valve body and the valve member, wherein pressurization of the second chamber causes the member to move to the second position and wherein the second chamber has a volume that increases as the body moves from the first to the second position and that decreases as the body moves from the second to the first position.

14. A valve according to claim 13 wherein a conduit provides for fluid communication between the plenum and first chamber.

15. A valve according to claim 14 wherein a majority of the fluid flow to the first chamber is through the conduit.

16. A valve according to claim 14 wherein the conduit is formed through the valve member.

* * * * *